United States Patent
Park (10) Patent No.: US 9,488,550 B2
(45) Date of Patent: Nov. 8, 2016

(54) METHOD FOR DETERMINING PITCHES OF COOLING FINS FOR A PNEUMATIC TIRE AND PNEUMATIC TIRE INCLUDING COOLING FINS ARRANGED BY THE SAME

(71) Applicant: KUMHO TIRE CO., INC., Gwangju (KR)

(72) Inventor: Woo-Cheol Park, Gwangju (KR)

(73) Assignee: KUMHO TIRE CO., INC., Gwangju (KR)

( * ) Notice: Subject to any disclaimer, the term of this patent is extended or adjusted under 35 U.S.C. 154(b) by 120 days.

(21) Appl. No.: 14/483,895

(22) Filed: Sep. 11, 2014

(65) Prior Publication Data

US 2015/0128690 A1 May 14, 2015

(30) Foreign Application Priority Data

Apr. 1, 2014 (KR) .......................... 10-2014-0038574

(51) Int. Cl.
| | |
|---|---|
| *G01M 17/02* | (2006.01) |
| *B60C 11/00* | (2006.01) |
| *B60C 27/00* | (2006.01) |
| *B60C 23/02* | (2006.01) |
| *B60C 23/06* | (2006.01) |
| *B60C 11/03* | (2006.01) |
| *B60C 13/02* | (2006.01) |
| *B60C 23/18* | (2006.01) |

(52) U.S. Cl.
CPC .......... *G01M 17/02* (2013.01); *B60C 11/0318* (2013.04); *B60C 13/02* (2013.01); *B60C 23/18* (2013.01)

(58) Field of Classification Search
None
See application file for complete search history.

(56) References Cited

U.S. PATENT DOCUMENTS

| | | | | |
|---|---|---|---|---|
| 5,759,312 | A * | 6/1998 | Wesolowski | B60C 11/0318 152/209.2 |
| 5,974,872 | A * | 11/1999 | Morishita | G01M 17/025 152/209.2 |
| 6,112,167 | A * | 8/2000 | Zakelj | B60C 11/0318 702/191 |
| 6,363,984 | B1 * | 4/2002 | Morgan | B60C 11/0318 152/209.2 |
| 6,514,366 | B1 * | 2/2003 | Xie | B60C 11/0318 152/209.2 |
| 7,006,930 | B2 * | 2/2006 | Stuckey | B60C 11/0318 152/209.2 |
| 7,769,567 | B2 * | 8/2010 | Stuckey | B60C 11/0318 703/2 |
| 2007/0175565 | A1 * | 8/2007 | Brown, Jr. | B60C 11/0306 156/110.1 |
| 2008/0093010 | A1 * | 4/2008 | Stuckey | B60C 11/0318 156/110.1 |

* cited by examiner

*Primary Examiner* — Andre Allen
*Assistant Examiner* — Jermaine Jenkins
(74) *Attorney, Agent, or Firm* — Baker & Hostetler LLP (57) ABSTRACT

Disclosed are a method for determining pitches of cooling fins for a pneumatic tire so that the heat dissipation performance of the sidewall may be improved and an airflow noise generated by a high speed air may be decreased, and a pneumatic tire including the cooling fins arranged by the same. The method for determining pitches of cooling fins for a pneumatic tire, including: selecting a total number of cooling fins, the number of pitch-types, and a size of each pitch; generating a random number and arranging each type of pitch sequentially by the generated random number to produce a random pitch arrangement; Fourier transforming the obtained pitch arrangement to calculate a result value (FT); and repeatedly performing the steps of producing a random pitch arrangement and calculating the FT to determine a pitch arrangement when a change in amplitude of the FT is smallest.

16 Claims, 8 Drawing Sheets

METHOD FOR DETERMINING PITCHES OF COOLING FINS FOR A PNEUMATIC TIRE AND PNEUMATIC TIRE INCLUDING COOLING FINS ARRANGED BY THE SAME

CROSS-REFERENCE TO RELATED APPLICATIONS

This application claims priority to Korean Patent Application Nos. 10-2013-0094144, filed on Aug. 8, 2013, 10-2014-0038574, filed on Apr. 1, 2014 and 10-2014-0038584, filed on Apr. 1, 2014 in the Korean Intellectual Property Office, the entire disclosures of which are incorporated herein by reference.

FIELD OF THE INVENTION

The present invention relates to a method for determining pitches of cooling fins for a pneumatic tire and a pneumatic tire including the cooling fins arranged by the same, and more specifically to a method for determining pitches of cooling fins for a pneumatic tire and properly arranging the determined cooling fins in such a manner that, in order to improve heat dissipation effect of a sidewall in which a large amount of heat is generated due to a bending and stretching motion during driving, a plurality of cooling fins of heat dissipating protrusions are formed on a surface of the sidewall, so that the heat dissipation performance of the sidewall may be improved and an airflow noise generated by a high speed air may be decreased, as well as a pneumatic tire including the cooling fins arranged by the same with reduced air resistance by increasing turbulence due to the high speed air.

BACKGROUND AND RELATED ART

Recently, reduction of a vehicle noise (for example, an airflow noise or machine sound) in a vehicle such as a passenger car has been further developed. However, according to continually increasing of needs for a comfortable riding environment, a necessity for a reduction of tire noise has increased more than before.

In order to reduce a noise of tread with respect to a road, various shapes of tread have been developed. A purpose of such a noise reduction technique is for dispersing noise frequencies generated by the tread to wideband frequencies, so as to reduce the noise near to a level of so-called white noise.

Further, relatively high temperature heat is generated from the tire mounted on the vehicle due to a high-speed rotation thereof or friction with the road surface. However, rubber which is a major component of the tire has a low heat dissipation performance due to the material characteristics thereof. For this reason, heat generated from the tire is not properly transmitted to an outside, therefore the lifespan of each component may be shortened, and the tire may be separated or ruptured due to a serious deterioration in tire durability. In particular, radial tires for trucks or buses which are used in harsh conditions, or run-flat tires for the purpose of traveling in an emergency situation are greatly influenced by durability due to a temperature.

When the run-flat tire travels in an emergency situation (in the case that pressure inside the tire is 0 psi), a periodically fluctuating load is applied to the tire, which causes a bending and stretching motion of the sidewall. When the inside of the tire is filled with air, a degree of bending and stretching motion in the sidewall is relatively small, but when the run-flat tire travels in an emergency situation of 0 psi, the degree thereof becomes large. In this case, heat is generated from the side wall by the continuously repeated large bending and stretching motion and thermal stress is continuously applied to sidewall reinforcing rubber for supporting the tire against load, causing a rupture in the tire.

In order to solve the problems, techniques for forming protruded cooling fins on the sidewall have been developed. For example, Korean Patent Laid-Open Publication No. 10-2010-0070796 discloses a pneumatic tire including blade-shaped structures and cooling fins formed on a sidewall for improving heat dissipation performance. However, these techniques have a problem that a resonance phenomenon occurs by an airflow noise generated during high speed air collapsing due to the cooling fins, and thereby the noise is significantly increased.

Accordingly, a technique capable of reducing an amount of heat convection in the sidewall from which a lot of heat is generated, as well as decreasing the airflow noise is required for a pneumatic tire.

In addition, for a conventional tire, since cooling fins are formed at fixed intervals for reducing heat generation and turbulence regularly generated by the collision of high speed air is insufficient for effectively radiating heat. That is, if sufficient turbulence is not generated, the air resistance does not easily decrease.

Accordingly, there is still a need for the pneumatic tire to reduce the amount of heat convection in the sidewall from which a lot of heat is generated, as well as efficiently decrease the air resistance.

SUMMARY OF THE INVENTION

In consideration of the above-described circumstances, it is an object of the present invention to provide a method for determining pitches of cooling fins for a pneumatic tire and properly arranging the determined cooling fins in such a manner that, in order to improve heat dissipation effect of the sidewall in which a large amount of heat is generated due to a bending and stretching motion during driving, a plurality of cooling fins of heat dissipating protrusions are formed on a surface of a sidewall, so that the heat dissipation performance of the sidewall may be improved and an airflow noise generated by a high speed air may be decreased, as well as a pneumatic tire including the cooling fins arranged by the same with reduced air resistance by increasing turbulence due to the high speed air.

In order to accomplish the above objects, according to one aspect of the present invention, there is provided a method for determining pitches of cooling fins for a pneumatic tire, including: selecting a total number of cooling fins, the number of pitch-types, and a size of each pitch; generating a random number and arranging each type of pitch sequentially by the generated random number to produce a random pitch arrangement; Fourier transforming the obtained pitch arrangement to calculate a result value (FT); and repeatedly performing the steps of producing a random pitch arrangement and calculating the FT to determine a pitch arrangement when a change in amplitude of the FT is smallest.

The cooling fin may include a plurality of bar-shaped fin unit bodies which are arranged at predetermined intervals with each other in a circumferential direction of a tire, and are arranged to be inclined toward a radial direction of the tire.

In addition, a width of lower parts of the fin unit bodies may be formed smaller than or equal to that of upper parts thereof.

Further, the fin unit bodies may include lower curved surfaces which are formed at the lower parts thereof so as to protrude toward one side in the circumferential direction of the tire; and upper curved surfaces which are formed at the upper parts so as to protrude toward the other side in the circumferential direction of the tire.

Further, the plurality of fin unit bodies may be formed so as to have different lengths from each other.

Further, a distance between the adjacent fin unit bodies may be formed so as to gradually increase toward an outside in the radial direction of the tire.

According to another aspect of the present invention, there is provided a pneumatic tire including cooling fins which are arranged by the above-described method for determining pitches of cooling fins.

Further, the fin unit bodies may have an inclination angle of 20 to 60°.

Furthermore, the cooling fin may include two to six fin unit bodies.

According to the present invention, it is possible to improve heat dissipation performance of the sidewall by properly arranging cooling fins thereof, and decrease the air flow noise generated by collapsing of the air due to the cooling fins.

That is, according to the present invention, it is possible to improve the quality of tire and driving stability by converting a flow of air generated by rotation of a tire during driving into turbulence so as to cool the sidewall of the tire and reduce the air flow noise thereof. In addition, when the run-flat tire travels in an emergency situation, it is possible to improve the driving performance of the tire in emergency driving by increasing heat dissipation performance in the sidewall.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. Referring to the drawings, wherein like reference characters designate like or corresponding parts throughout the several views. In the embodiments of the present invention, a detailed description of publicly known functions and configurations that are judged to be able to make the purport of the present invention unnecessarily obscure are omitted.

A method for determining pitches of cooling fins for a pneumatic tire according to the present invention will be described.

First, a total number of cooling fins 10, the number of pitch-types, and a size of each pitch are selected. Preferably, the cooling fins 10 have a shape capable of improving a contact area with air. The cooling fins 10 may have various shapes such as a shape shown in FIGS. 1 to 3 without particular limitation thereof.

Figure 3:
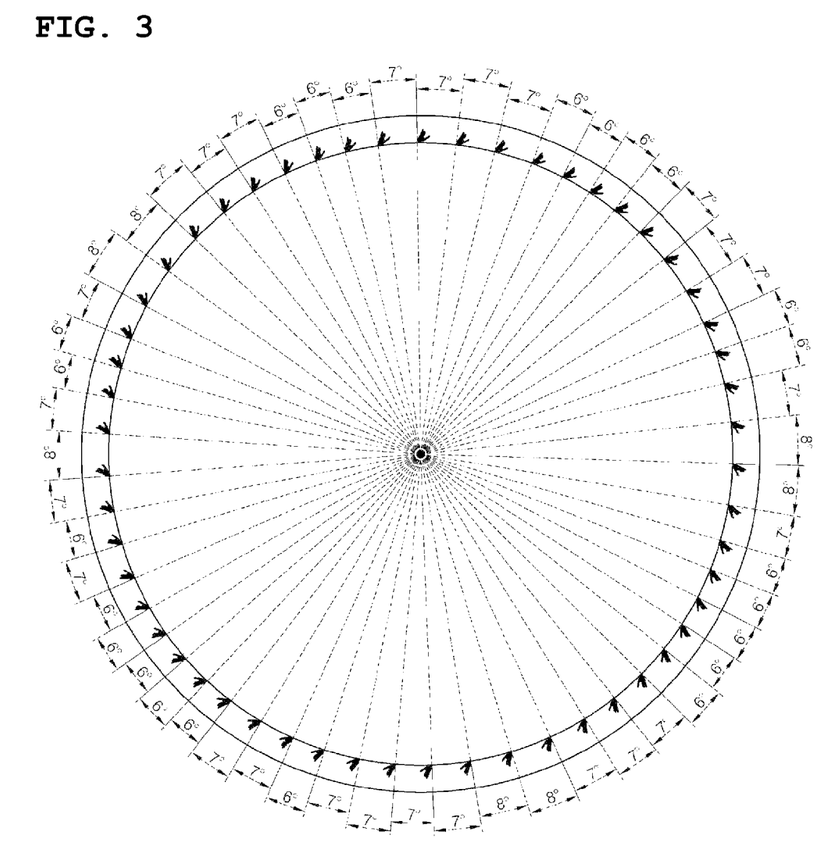
FIG. 3 is a schematic view illustrating the cooling fins arranged on the pneumatic tire shown in FIG. 1 in accordance with pitches determined by the method of the present invention.

Herein, the number of pitch-types means the number of types applied to the pitch of the cooling fins 10. For example, if three types of pitch (6°, 7° and 8°) are used as shown in FIG. 3, the number of pitch-types is three. After selecting the total number of cooling fins 10 and the number of pitch-types, a size of each pitch is determined. The size may be determined by a length of the pitches. However, since the cooling fins 10 are arranged on the same circumference of the tire, the size may be determined by a length of each pitch.

Next, a random number is generated using a random number generator and each type of pitch is arranged sequentially by the generated random number to produce a random pitch arrangement. Accordingly, as shown in FIG. 3, there is no pitch arranged according to a unified rule, entirely unlike the case of composing of at least one pitch related to a specific sequence of numbers.

Then, the obtained pitch arrangement as described above is Fourier transformed to calculate a result value (FT). Therefore, a change in amplitude of the Fourier transform (FT) may be calculated based on the change in pitch.

These steps of producing a random pitch arrangement and calculating the FT which was obtained by the produced pitch arrangement are repeatedly performed several times to determine a pitch arrangement when a change in amplitude of the FT is smallest, and pneumatic tires formed with cooling fins are manufactured based on the selected pitch arrangement.

According to the present invention having the above-described configuration, it is possible to reduce a loudness level of the air flow noise while using the same cooling fins.

Next, the cooling fins 10 of a pneumatic tire 1 according to a first embodiment of the present invention will be described with reference to FIGS. 1 to 3.

Figure 2:
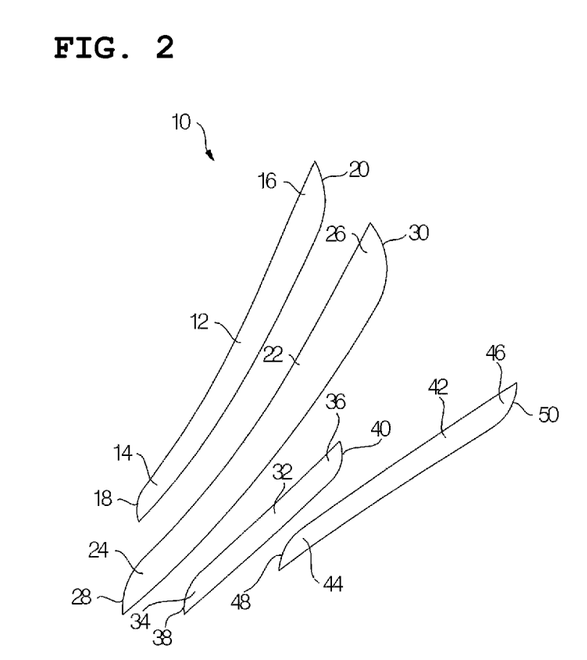
FIG. 2 is an enlarged perspective view of the cooling fin shown in FIG. 1.

As shown in FIG. 2, the cooling fin 10 includes a plurality of (four in the present invention) bar-shaped fin unit bodies 12, 22, 32 and 42 which are arranged at predetermined intervals with each other in a circumferential direction of the tire, and are arranged to be inclined toward a radial direction of the tire. At this time, it is preferable that the fin unit bodies 12, 22, 32 and 42 have an inclination angle of 20 to 60° in terms of cooling, and the cooling fin 10 includes two to six fin unit bodies 12, 22, 32 and 42.

The fin unit bodies 12, 22, 32 and 42 may be formed to incline substantially at 30 to 60° toward the radial direction of the tire. When the fin unit bodies 12, 22, 32 and 42 are formed to incline within the above-described range, air flow from the front flows to outside in a radial direction of the tire.

Herein, a width of lower parts 14, 24, 34 and 44 of the fin unit bodies 12, 22, 32 and 42 may be formed smaller than or equal to that of upper parts 16, 26, 36 and 46 thereof. In particular, the fin unit bodies 12, 22, 32 and 42 include: lower curved surfaces 18, 28, 38 and 48 which are formed at the lower parts 14, 24, 34 and 44 thereof so as to protrude toward one side in the circumferential direction of the tire; and upper curved surfaces 20, 30, 40 and 50 which are formed at the upper parts 16, 26, 36 and 46 so as to protrude toward the other side in the circumferential direction of the tire. Referring to FIG. 2, when air flows from a left side to a right as a car moves to the left side, lower curved surfaces 18, 28, 38 and 48 allow air to flow to an upper surface side of the fin unit bodies 12, 22, 32 and 42, while the upper curved surfaces 20, 30, 40 and 50 allow a direction of air flowing through a lower surface side of the fin unit bodies 12, 22, 32 and 42 to be rapidly converted outward in the radial direction of the tire, so that air may be discharged to the outside at a high speed.

Further, in order to largely increase the heat transfer effect by forming turbulence, the plurality of fin unit bodies 12, 22, 32 and 42 may be formed so as to have different lengths from each other.

A distance between the adjacent fin unit bodies 12, 22, 32 and 42 may be formed so as to gradually increase toward an outside in the radial direction of the tire. Therefore, air between the fin unit bodies 12, 22, 32 and 42 may be easily discharged outward.

Figure 1:
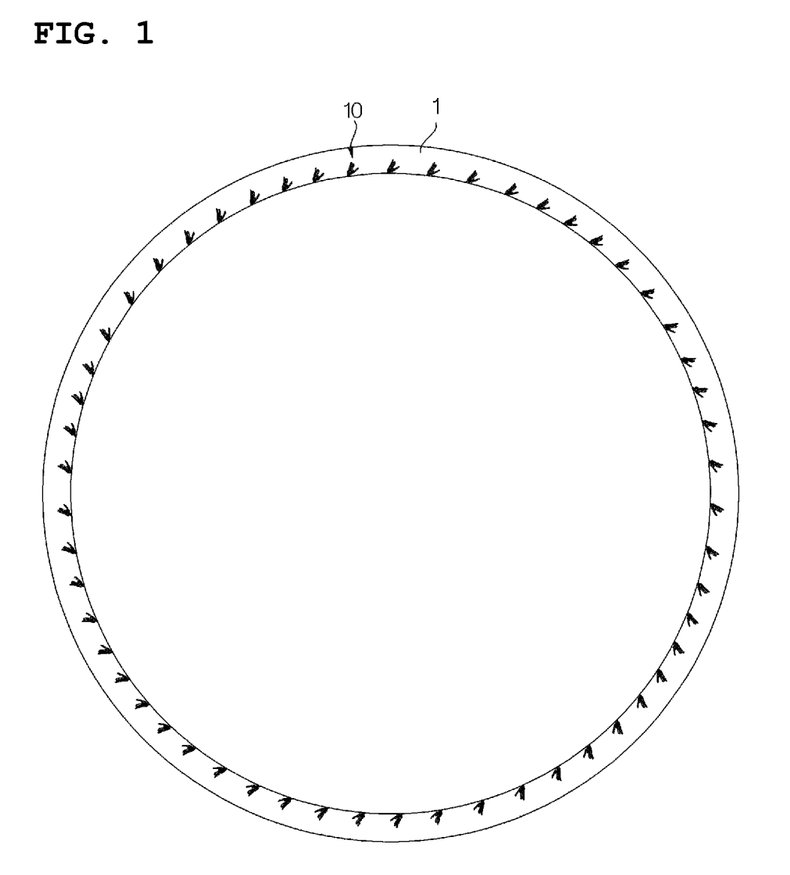
FIG. 1 is a perspective view of a pneumatic tire with cooling fins disposed thereon according to a first embodiment of the present invention.

FIG. 1 illustrates the pneumatic tire 1 including the cooling fins 10 of the first embodiment arranged by the above-described method according to the present invention, and FIG. 3 illustrates the cooling fins 10 arranged at intervals with various pitch angles (6°, 7° and 8°).

Next, cooling fins 104 of a pneumatic tire 100 according to a second embodiment of the present invention will be described with reference to FIGS. 4 to 7.

Figure 5:
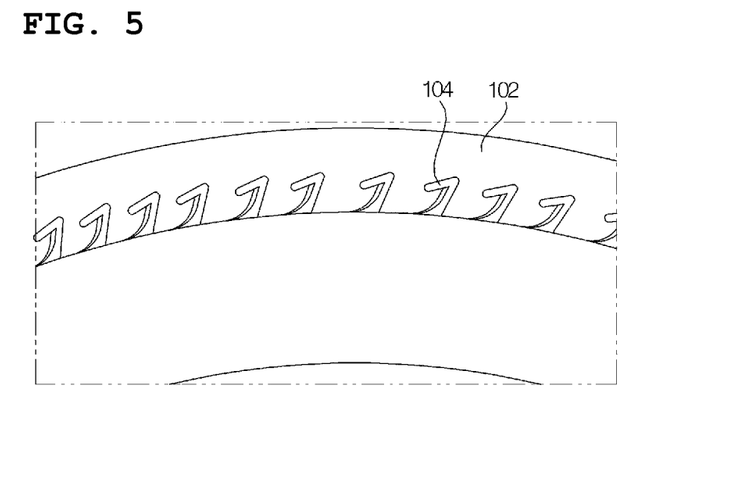
FIG. 5 is a partially enlarged view of the pneumatic tire shown in FIG. 4.
Figure 6:
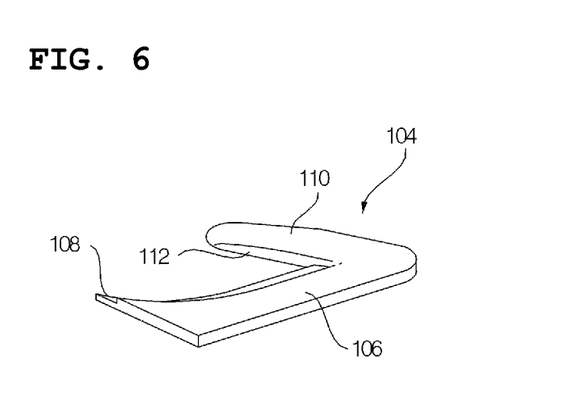
FIG. 6 is an enlarged perspective view of the cooling fin shown in FIG. 4.

As shown in FIGS. 5 and 6, the cooling fins 104, formed on a surface of a sidewall 102 of the pneumatic tire 100 according to the second embodiment of the present invention, include a first bar part 110 and a second bar part 106 which are connected with each other at an acute angle. Therefore, the cooling fin 104 is formed in a substantially V shape by the first and second bar parts 110 and 106 as a whole. Herein, a V-shaped vertex formed by the first and second bar parts 110 and 106 is disposed to be inclined in the circumferential direction of the tire.

In addition, the second bar part 106 is formed to be inclined in the radial direction of the tire. As a result, an angle of the second bar part 106 with respect to the radial direction of the tire is smaller than that of the first bar part 110 with respect to the radial direction of the tire.

Further, an end portion of the second bar part 106 is disposed closer to a center of rotation of the tire than an end portion of the first bar part 110 in the radial direction of the tire. Herein, the second bar part 106 has a stepped portion 108 formed on the end portion thereof with a reduced thickness, thereby turbulence formed by an impact with the air flow may be increased.

In addition, the end portion of the second bar part 106 has a width larger than the corner formed with the first bar part 110, and thereby it plays a role to move the air toward the corner formed by the first and second bar parts 110 and 106. Further, the end of the first bar part 110 is formed in a curved surface or inclined surface, and thereby it plays a role to guide the air to the upper surface of the first bar part 110 so as to be collapsed with turbulence formed by the second bar part 106. As a result, it is possible to increase the heat dissipation effect by the enhanced turbulence.

Figure 4:
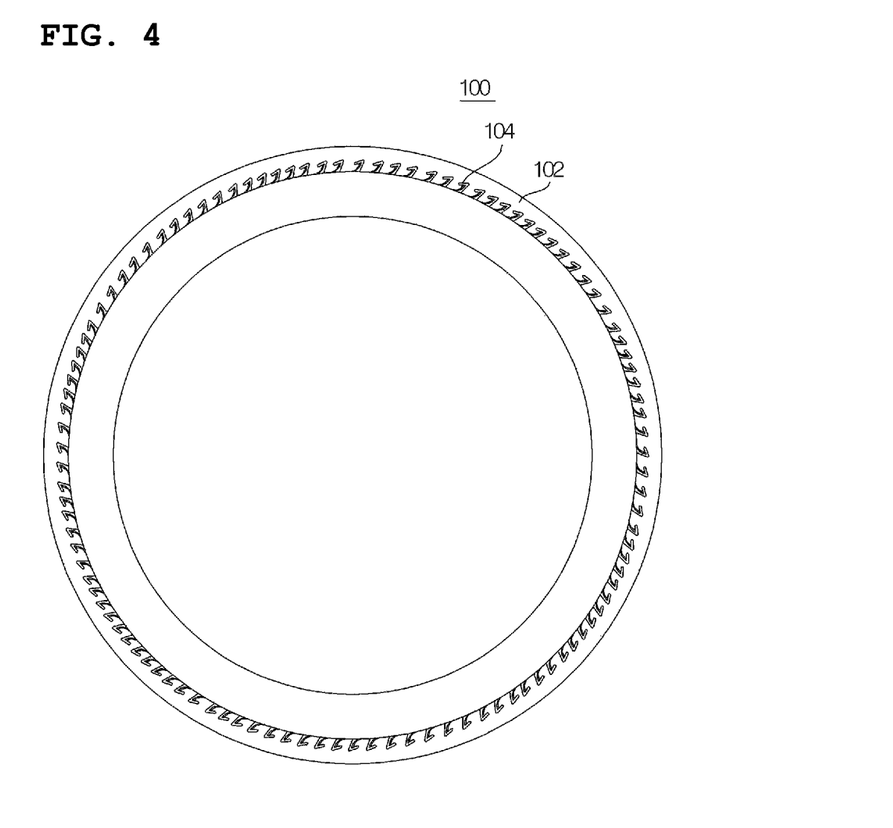
FIG. 4 is a perspective view of a pneumatic tire with cooling fins disposed thereon according to a second embodiment of the present invention.
Figure 7:
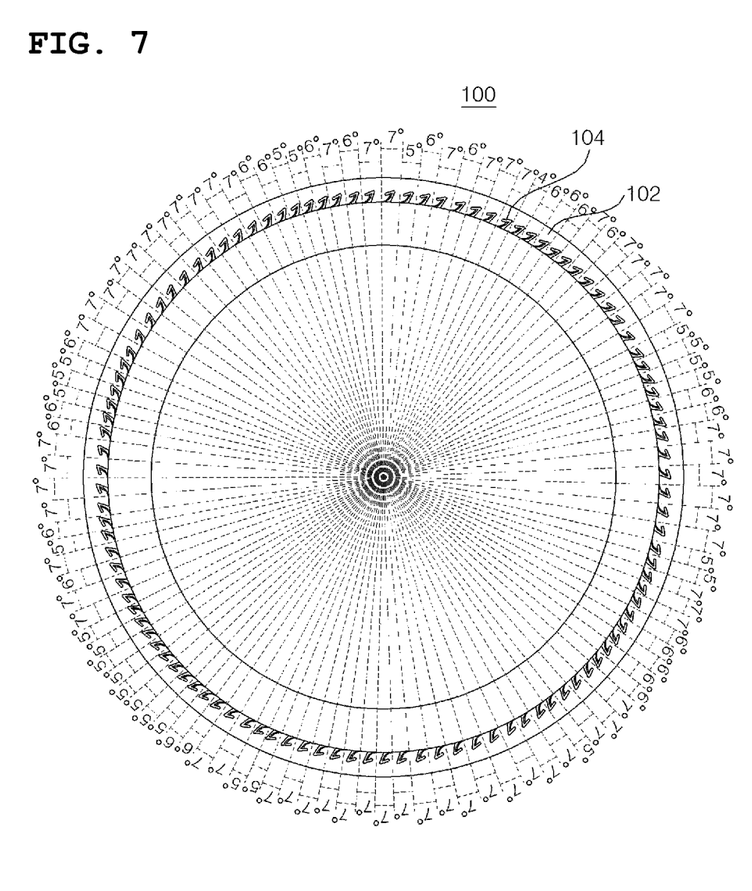
FIG. 7 is a schematic view illustrating the cooling fins arranged on the pneumatic tire shown in FIG. 4 in accordance with pitches determined by the method of the present invention.

FIG. 4 illustrates the pneumatic tire 100 including the cooling fins 104 of the second embodiment arranged by the above-described method according to the present invention, and FIG. 7 illustrates the cooling fins 104 arranged on the sidewall 102 at intervals with various pitch angles (5°, 6° and 7°).

Finally, cooling fins 204 of a pneumatic tire 200 according to a third embodiment of the present invention will be described with reference to FIGS. 8 to 10.

Figure 10:
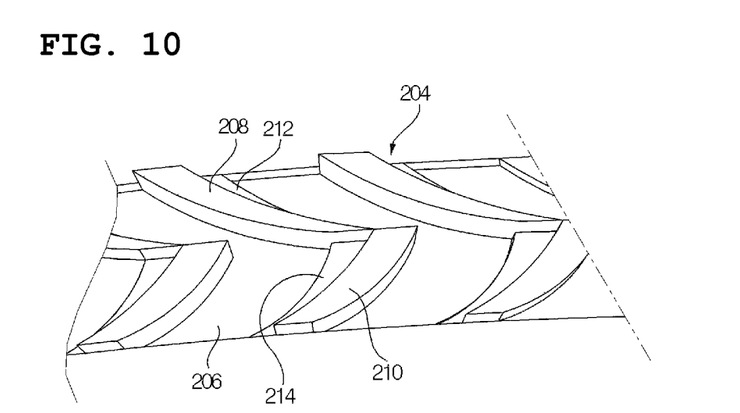
FIG. 10 is an enlarged perspective view of the cooling fin shown in FIG. 7.

As shown in FIG. 10, the cooling fins 204, formed on a surface of a sidewall 202 of the pneumatic tire 200 according to the third embodiment of the present invention, include a first protrusion part 208 and a second protrusion part 210 which are connected with each other at an acute angle. Therefore, the cooling fin 204 is formed in a substantially V shape by the first and second protrusion parts 208 and 210 as a whole. Herein, a V-shaped vertex formed by the first and second protrusion parts 208 and 210 is disposed in the circumferential direction of the tire.

Herein, the first protrusion part 208 and the second protrusion part 210 are formed to be inclined in the radial direction of the tire with incline directions opposite to each other.

In addition, an end portion of the second bar part 210 is disposed closer to the center of rotation of the tire than an end portion of the first bar part 208 in the radial direction of the tire. Further, the first protrusion part 208 has a first stepped portion 212 formed on the end portion thereof with a reduced thickness, thereby the turbulence formed by the impact with the air flow may be increased. Similarly, the second protrusion part 210 has a second stepped portion 214 formed on the end portion thereof with a reduced thickness, and thereby the turbulence formed by the impact with the air flow may be increased. Herein, the first stepped portion 212 and the second stepped portion 214 are not connected with each other, and the first stepped portion 212 is located on an outside in the circumferential direction of the tire based on a V-shaped region surrounded by the first and second protrusion parts 208 and 210, while the second stepped portion 214 is located on an inside thereof. As a result, it is possible to increase the heat dissipation effect by the enhanced turbulence.

The pneumatic tire 200 has a depressed section 206 which is formed around the cooling fin 204 to be lower than the cooling fin 204 from the sidewall 202. Therefore, the first and second protrusion parts 208 and 210 have a relatively increased height compared to the depressed section 206 which has the lowest height. As a result, stronger turbulence may be formed than the case of having only the cooling fins 204 without the depressed section 206.

Figure 8:
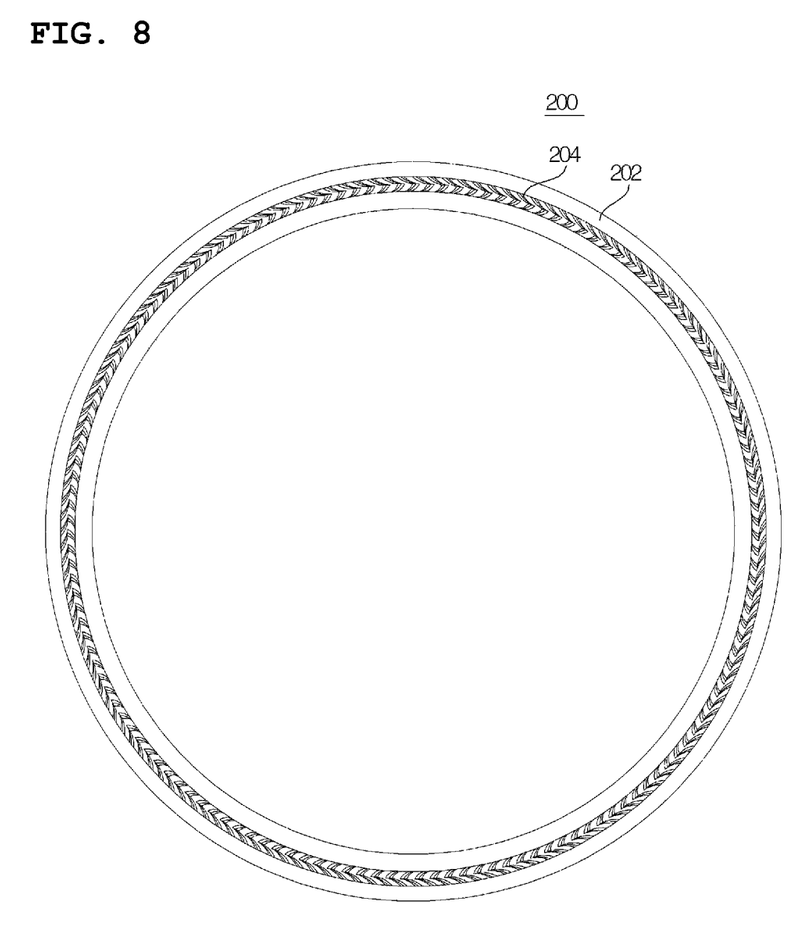
FIG. 8 is a perspective view of a pneumatic tire with cooling fins disposed thereon according to a third embodiment of the present invention.
Figure 9:
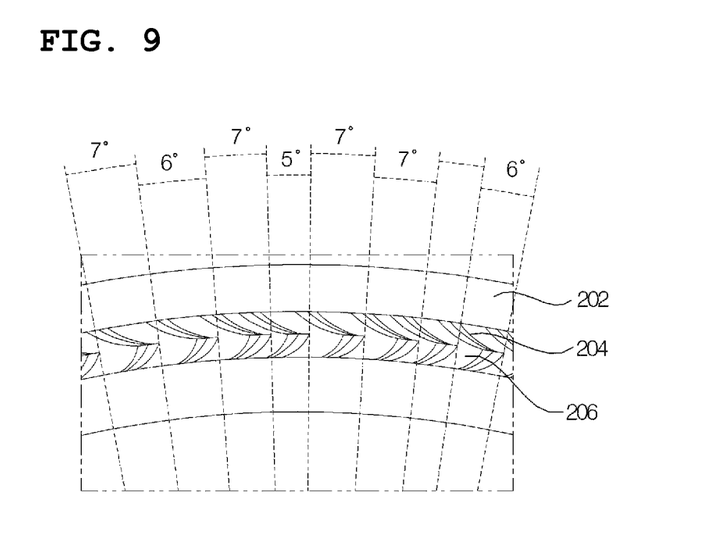
FIG. 9 is a partially enlarged view of the pneumatic tire shown in FIG. 7.

FIG. 8 illustrates the pneumatic tire 200 including the cooling fins 204 of the third embodiment arranged by the above-described method according to the present invention, and FIG. 9 illustrates the cooling fins 204 arranged on the depressed section 206 of the sidewall 202 at intervals with various pitch angles (5°, 6° and 7°).

While the present invention has been described with reference to the preferred embodiments, the present invention is not limited to the above-described embodiments, and it will be understood by those skilled in the related art that various modifications and variations may be made therein without departing from the scope of the present invention as defined by the appended claims.

What is claimed is:

1. A method for determining pitches of sidewall cooling fins for a pneumatic tire, comprising:
    selecting a total number of sidewall cooling fins, a number of pitch-types, and a size of each pitch via;
    generating a random number and arranging each type of pitch sequentially by the generated random number to produce a random pitch arrangement;
    Fourier transforming the random pitch arrangement to calculate a result value (FT);
    repeatedly performing the steps of producing a random pitch arrangement and calculating the FT to determine a pitch arrangement when a change in amplitude of the FT is smallest; and
    outputting a design for a pneumatic tire having the sidewall cooling fin that includes a plurality of bar-shaped pin unit bodies which are arranged at predetermined intervals with each other in a circumferential direction of a tire, and are arranged to be inclined toward a radial direction of the tire.

2. The method according to claim 1, wherein a width of lower parts of the pin unit bodies is formed smaller than or equal to that of upper parts thereof.

3. The method according to claim 1, wherein the pin unit bodies include lower curved surfaces which are formed at the lower parts thereof so as to protrude toward one side in the circumferential direction of the tire; and upper curved surfaces which are formed at the upper parts so as to protrude toward the other side in the circumferential direction of the tire.

4. The method according to claim 1, wherein the plurality of pin unit bodies is formed so as to have different lengths from each other.

5. The method according to claim 1, wherein a distance between the adjacent pin unit bodies is formed so as to gradually increase toward an outside in the radial direction of the tire.

6. The method according to claim 1, wherein the pin unit bodies have an inclination angle of 20 to 60°.

7. The method according to claim 1, wherein the sidewall cooling fin includes two to six pin unit bodies.

8. A pneumatic tire comprising cooling fins which are arranged by the method for determining pitches of sidewall cooling pins according to claim 1.

9. A method for determining pitches of sidewall cooling fins for a pneumatic tire, comprising:
    selecting a total number of sidewall cooling fins, a number of pitch-types, and a size of each pitch;
    generating a random number and arranging each type of pitch sequentially by the generated random number to produce a random pitch arrangement;
    Fourier transforming the random pitch arrangement to calculate a result value (FT); and
    repeatedly performing the steps of producing a random pitch arrangement and calculating the FT to determine a pitch arrangement when a change in amplitude of the FT is smallest; and
    outputting a design for a pneumatic tire having the sidewall cooling fin that includes a first bar part and a second bar part which are connected with each other at an acute angle, wherein the second bar part is formed to be inclined in the radial direction of the tire, and an end portion of the second bar part is disposed closer to a center of rotation of the tire than an end portion of the first bar part in the radial direction of the tire.

10. The method according to claim 9, wherein the second bar part has a stepped portion formed on the end portion thereof with a reduced thickness.

11. The method according to claim 9, wherein the end portion of the second bar part has a width larger than a corner formed with the first bar part.

12. The method according to claim 9, wherein the end of the first bar part is formed in a curved surface or inclined surface.

13. A method for determining pitches of sidewall cooling fins for a pneumatic tire, comprising:
    selecting a total number of sidewall cooling fins, a number of pitch-types, and a size of each pitch;
    generating a random number and arranging each type of pitch sequentially by the generated random number to produce a random pitch arrangement;
    Fourier transforming the random pitch arrangement to calculate a result value (FT); and
    repeatedly performing the steps of producing a random pitch arrangement and calculating the FT to determine a pitch arrangement when a change in amplitude of the FT is smallest; and
    outputting a design for a pneumatic tire having a depressed section which is formed around the sidewall cooling fin that is configured to be lower than the sidewall cooling fin.

14. The method according to claim 13, wherein the sidewall cooling fin includes a first protrusion part and a second protrusion part which are connected with each other at an acute angle, an end portion of the second protrusion bar part is disposed closer to a center of rotation of the tire than an end portion of the first protrusion bar part in the radial direction of the tire.

15. The method according to claim 14, wherein the first protrusion part has a first stepped portion formed on the end portion thereof with a reduced thickness, and the second protrusion part has a second stepped portion formed on the end portion thereof with a reduced thickness.

16. The method according to claim 15, wherein one of the first stepped portion and the second stepped portion is located on an outside in the circumferential direction of the tire based on a V-shaped region surrounded by the first and second protrusion parts, and the other thereof is located on an inside thereof.

* * * * *